(12) United States Patent
Spiri et al.

(10) Patent No.: US 12,285,981 B2
(45) Date of Patent: Apr. 29, 2025

(54) TIRE

(71) Applicant: Bridgestone Europe NV/SA [BE/BE], Zaventem (BE)

(72) Inventors: Luca Spiri, Rome (IT); Brenda Cecilia Barrios Perez, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 199 days.

(21) Appl. No.: 17/919,361

(22) PCT Filed: Apr. 16, 2021

(86) PCT No.: PCT/EP2021/059907
§ 371 (c)(1),
(2) Date: Oct. 17, 2022

(87) PCT Pub. No.: WO2021/209598
PCT Pub. Date: Oct. 21, 2021

(65) Prior Publication Data
US 2023/0150311 A1    May 18, 2023

(30) Foreign Application Priority Data

Apr. 17, 2020  (EP) ..................................... 20170043

(51) Int. Cl.
*B60C 9/18*    (2006.01)
*B60C 9/22*    (2006.01)
(Continued)

(52) U.S. Cl.
CPC ................ *B60C 9/28* (2013.01); *B60C 11/03* (2013.01); *B60C 2009/208* (2013.01); *B60C 2009/2093* (2013.01); *B60C 2011/0348* (2013.01)

(58) Field of Classification Search
CPC ........... B60C 9/2006; B60C 9/18; B60C 9/22; B60C 2009/208; B60C 2009/2252;
(Continued)

(56) References Cited

U.S. PATENT DOCUMENTS 2,699,193 A    1/1955  Overman
5,591,284 A *  1/1997  Gaudin ................. B60C 9/2006
                                                    152/526
(Continued)

FOREIGN PATENT DOCUMENTS

EP         320705 A  *  6/1989  ........... B60C 9/1821
EP       2421716 A2     2/2012
(Continued)

OTHER PUBLICATIONS

International Search Authority: International Search Report for corresponding International Patent Application No. PCT/EP2021/059907 dated May 26, 2021, 4 pages.

*Primary Examiner* — Cedrick S Williams
(74) *Attorney, Agent, or Firm* — Patterson Intellectual Property Law, PC

(57) ABSTRACT

The present invention relates to a tyre (1) comprising: —a carcass (5); —at least one high elongation belt (1, 2, 3, 4), being applied as a single cord externally to said carcass (5); and —an external tread portion (6), provided with two or more grooves (7) extending according to a circumferential direction (L) around said tread portion (6), wherein the axial width (Wg) of at least one of said grooves (7), measured according to an axial direction (A) parallel to an axis of rotation (R) of said tyre (10) and orthogonal to said circumferential direction (L), is at most equal to 2 millimeters.

15 Claims, 4 Drawing Sheets

(51) Int. Cl.
*B60C 9/28* (2006.01)
*B60C 11/03* (2006.01)
*B60C 9/20* (2006.01)

(58) Field of Classification Search
CPC .... B60C 2009/2233; B60C 2009/2288; B60C 2009/2214
See application file for complete search history.

(56) References Cited

U.S. PATENT DOCUMENTS

| | | | |
|---|---|---|---|
| 6,851,463 B1* | 2/2005 | Socci | B60C 9/263 |
| | | | 152/526 |
| 2006/0179813 A1* | 8/2006 | Vanneste | D02G 3/48 |
| | | | 57/211 |
| 2009/0000717 A1* | 1/2009 | Ikehara | B60C 9/0007 |
| | | | 152/451 |
| 2010/0147438 A1 | 6/2010 | Domingo et al. | |
| 2012/0011823 A1* | 1/2012 | Del Rio Rodriguez | |
| | | | D07B 1/0613 |
| | | | 57/237 |
| 2014/0238568 A1 | 8/2014 | Haga | |
| 2019/0135052 A1 | 5/2019 | Ogawa et al. | |

FOREIGN PATENT DOCUMENTS

| | | | | |
|---|---|---|---|---|
| EP | 2495111 A1 | 9/2012 | | |
| EP | 3130483 A1 | 2/2017 | | |
| EP | 3450211 B1 * | 4/2020 | ......... | B60C 11/0083 |
| WO | 2017103431 A1 | 6/2017 | | |

* cited by examiner

| | | PlySteer [lbf]% |
|---|---|---|
| Standard Pattern | | 100 |
| Closed Pattern | | 140 |

TIRE

TECHNICAL FIELD OF THE INVENTION

The present invention relates to an improved tire provided with a closed pattern design of the tread, in particular a truck or bus tire.

BACKGROUND

Tires provided with a "closed pattern technology" are well known in the art.

Conventional truck or bus tire pattern is featuring a geometry with one or more longitudinal grooves having a width that ranges from 6 to 15 millimeters. The "closed pattern technology" provides to reduce the width of one or more tread grooves, resulting in a groove width that generically ranges from 0.5 to 4 millimeters, with the aim of improving tire rolling losses.

Tire rolling losses are due to tire cyclic deformation under rolling and depend on rubber strain, material viscoelasticity and rubber volumes, according to the following known relation (wherein RRc is the Rolling resistance coefficient):

$$RRc = \tan \delta \cdot Volume \cdot Strain$$

According to the standard practice, a closed pattern design of the tread allows to reduce rolling resistance by increasing tread compression stiffness and reducing rib/block deformation in loading/rolling. As way of example, in FIG. 2 a graph is shown, wherein each portion of the graph below a groove imagine numbered by I., II. or III., respectively corresponding to little, medium and big grooves, refers to the void ratio of the specific kind of groove. In the present specification, grooves are defined "little" if their width is equal to about 2 mm, "medium" if their width is equal to about 6 mm, and "big" if their width is equal to about 10 mm. In the graph, the growing of the rolling resistance passing from little to big grooves (groove images I. to III.) is shown by line A, wherein the interrupted line B represents the decreasing of the stiffness passing form little to big grooves.

In order to assess how such technical effects could be achieved, it should be considered that ribs are subject to vertical pressure during rolling of the tire. Due to rubber Poisson's effect, the deformed shape of the ribs will expand in a direction perpendicular to the direction of compression, thus contributing to the global rolling resistance of the tire.

In closed patterns, tire compression stiffness is increased by reducing the distance of grooves' walls, which causes interlocking deformations of opposite faces of groove during rolling of the tire (FIGS. 3A-3C).

One of the trade-off of the closed pattern design is an increase of the ply-steer effect, which has a negative impact on tire wear and irregular wear. In particular, the rolling resistance coefficient RRc associated to a closed pattern tire is about 2% lower than that of a standard pattern tire.

Generally, a tire crown structure is made with multiple layers of plies bonded together to realize multi-ply systems, which twist and bend when subjected to simple tensile load. The result is a combination of bending, shearing and stretching of the laminate.

Moreover, when the tire is in a condition of free rolling, the toroidal shape of tire becomes flat at the contact patch, so lateral and longitudinal shear stresses are generated in the contact area (tread blocks). In addition, in plane, shear also occurs due to change in belt tension at contact patch. Such shear stresses, applied to the individual tread blocks, cause coupled reaction forces, resulting in an aligning torque.

Thus, tires generate measurable lateral force and self-aligning moment under straight rolling condition. Ply steer side force is an inherent property of a belted radial tire, which is the nonzero side force at zero slip angles.

Pulling forces that stretch the belt package (causing ply-steer) are generated at the inflation stage, then tire loading/bending is relaxing the belt tension. The higher is the tire bending, the higher is the belt relaxation and consequently the lower are the ply-steer forces. The closed pattern stiffens the tire crown and constrains the tire bending, thus leading to lower belt relaxation and higher ply-steer forces.

In order to evaluate the impact of tread geometry on ply-steer effect, a FEM simulation has been run using two different pattern geometries of the tread: standard and closed pattern. The results of such simulation are shown in attached FIGS. 4 and 5, and clearly show that closed pattern geometry leads to a negative incrementation of the ply-steer effect.

SUMMARY OF THE INVENTION

The technical problem posed and solved by the present invention is therefore to provide a tire which allows overcoming the disadvantages mentioned above with reference to the known art.

This problem is solved by a tire according to claim 1. Preferred features of the present invention are object of the dependent claims.

According to a first aspect of the invention, a tire comprising a carcass, an external tread portion provided with a closed pattern design and at least one high elongation (HE) belt, applied as a single cord or as a strip of multiple cords, in particular arranged between bias working belts, is provided.

In the present application, the expression "High Elongation Belt" refers to a belt characterized by a stiffness module variable as a function of strain. In particular, the stiffness module is directly proportional to the strain, that means the stiffness module is low for little strain, and higher for higher strain.

This allows the cord (or cords) to expand during the vulcanization process and to ensure high stiffness modulus during operation. The steel cord (or cords) guarantees such technical effect, thanks to the geometry of the strand.

For better clarity, a High Elongation Belt is a belt embedding a cord provided with a stiffness module variable between about 3.000 Mpa (low modulus, from 0 to about 2% of strain or elongation) and 125.000 Mpa (high modulus, for strain higher than about 2%), said cord having an elongation at break between 2.5% and 3.5%. The elongation at break being measured on a sample extracted from a vulcanized tire.

A plurality of known types of High Elongation Belt are currently available.

According to the invention, the at least one High Elongation Belt could be applied as a single cord or as a strip of multiple cord, for example six or nine cords.

To this extent, the above stiffness properties are not due to the belt itself, but to the single cord configuration that makes up the belt (i.e. the plurality of single cords arranged parallel to each other or the strips of six or nine cords arranged also parallel to each other).

The application of at least one High Elongation Belt, preferably a system comprising one or at most two high elongation belts, provides great advantages with respect to the traditional belt construction.

The latter traditional kind of construction, with reference to low profiles truck or bus tire, usually provides the posing of one or two longitudinal 'wavy belts', also known as 'waved belts', applied as a strip of plurality of calendered cords (preferably nine cords) with a certain 'posing angle', or 'belt cord angle', θ. Moreover, the edges of such a strip need to be protected with an additional overlap of belt strip, to avoid durability issues.

Furthermore, during the construction of conventional (wavy) tire, after the wrapping of the nine cords strip, an additional complete turn of the strip is added at the beginning and at the end of the wrapping, in order to avoid the lasting of free cords: in this way, a turn on edge is realized.

Belt strip application angle and the presence of the turn on edge affect ply-steer forces by increasing them, since an increasing of the thickness between the crossing belts (turn on edges) and also a residual belt cord angle θ is provided.

On the contrary, the at least one high elongation belt of the claimed invention is applied as a single cord strip. The switching from a strip of plurality of cords to a single cord strongly reduces the belt cord angle θ, and moreover avoids the need of a turn on edge (no free edges).

In particular, the at least one high elongation belt is applied at 0°, as a longitudinal belt. Advantageously, a lower asymmetry of the belt package, due to a low belt cord angle θ of the HE application, will result in a lower ply-steer force.

The comparative Table 1 provided below shows the main differences, regarding parameters such as axial width A and belt cord angle θ (the angle comprised between the cord and the longitudinal direction L shown in FIGS. 1 and 2), between a prior art belt system and a preferred embodiment of belt system according to the claimed invention provided with one high elongation belt, the two compared belt systems having the same closed pattern and comprising four belts (numbered 1 to 4):

TABLE 1

| TIRE | 1 | | 2 | | 3 | | 4 | |
|---|---|---|---|---|---|---|---|---|
| | A | θ | A | θ | A | θ | A | θ |
| Traditional belt package | 230 | 52° L | 200 | 0° (Waved) | 250 | 28° R | 100 | 28° L |
| Proposed Belt package | 230 | 40° L | 215 | 0° (HE) | 250 | 28° R | 130 | 52° L |

The letters L and R reported near the belt cord angle values in Table 1 correspond respectively to the Left or Right direction according to which the amplitude of the concerned belt cord angle is measured, starting from the circumferential direction. R corresponds to an angle measured clockwise starting from the circumferential direction, whereas L corresponds to an angle measured counterclockwise starting from the circumferential direction.

In the attached FIG. 6, experimental data (wear energy in several tire pattern points) are reported, showing how ply-steer forces change from the above cited prior art belt system (in particular a wavy tire) and the preferred embodiment of belt system according to the claimed invention (High Elongation tire), which reference is made in Table 1.

In FIG. 6, the portion of abscissa axis ranging from about −125 a 125 mm refers to the lateral position of the considered points onto the tread. FIG. 6 clearly shows that average slip angle, for fixed lateral force (Fy=0), is higher for the prior art wavy tire, which means the prior art tire is associated to higher ply-steer forces for a slip angle equal to 0°.

Therefore, the combination of a closed pattern technology with the at least one high elongation belt according to the claimed tire configuration allows to obtain a low ply-steer force, and thus low wear and irregular wear performances of the tire.

That is, the application of at least one high elongation belt to a closed pattern tire allows to neutralize the negative effects provided by the closed pattern, and to enjoy only the positive effects thereof.

Other advantages, features and modes of employ of the present invention will become evident from the following detailed description of some embodiments, presented by way of example and not of limitation.

BRIEF DESCRIPTION OF THE DRAWINGS

Reference will be made to the Figures of the enclosed drawings, wherein.

The dimensions, as well as thicknesses and curvatures, shown in the Figures introduced above are to be understood as purely exemplary and are not necessarily shown in proportion. Moreover, as said, in said Figures some layers/components of the tire may have been omitted, for a clearer illustration of aspects of the present invention.

DETAILED DESCRIPTION OF PREFERRED EMBODIMENTS

Hereinafter, several embodiments and variations of the invention will be described, with reference to the Figures introduced above.

Moreover, the different embodiments and variants described in the following are possibly employed in combination, when they are compatible.

An improved tire according to the present invention provides a new belt construction in combination with a closed pattern design of the tread, in order to balance ply-steer trade off and enhance rolling resistance RRc and wear performances, so to avoid the disadvantages of the prior art tire having a closed pattern design.

Figure 1:
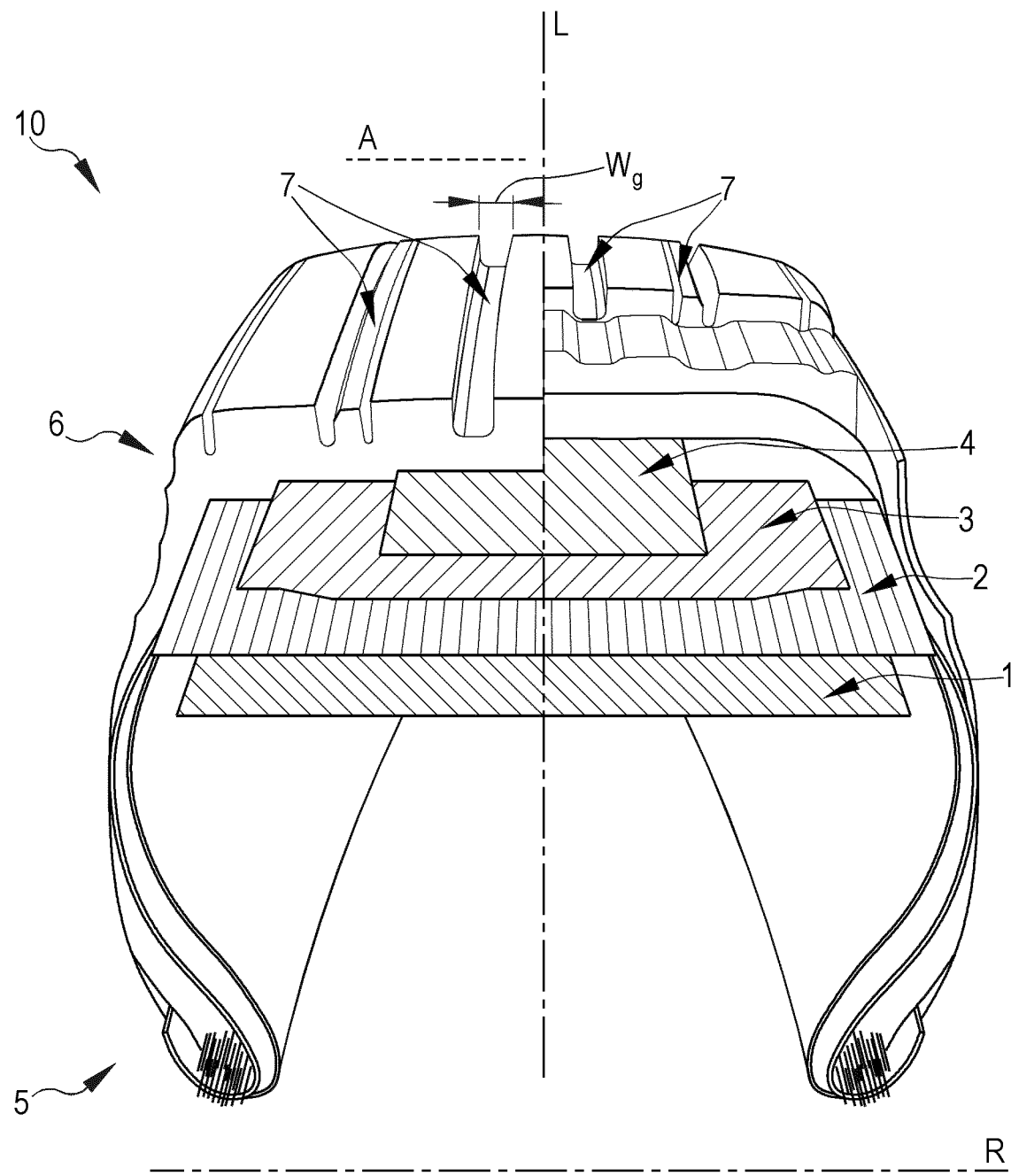
FIG. 1 shows a schematic cross-sectional view of a preferred embodiment of a tire according to the present invention, of which, for greater clarity, only a section has been represented, some parts of which being exemplified.

As just said, the tire according to the present invention comprises an external tread portion provided with two or more grooves designed to realize a closed pattern. With reference to FIG. 1, a preferred embodiment of tire 10 comprises a tread portion 6 provided with two or more grooves 7, the grooves 7 extending according to a circumferential direction L around said tread portion 6.

The axial width $W_g$ of at least one of said grooves 7, measured according to an axial direction A parallel to an axis of rotation R of the tire 10 and orthogonal to said circumferential direction L, ranges from 0.5 to 4 millimeters, in particular is lower than, or at least equal to, 2 millimeters.

The axial width $W_g$ of said groove 7 is substantially constant over the full depth of the groove. By substantially it is meant that the groove walls might have a slight inclination of between 2 to 5 degrees with respect to the orthogonal plane in the point they intersect the tread rolling surface.

The radial depth $D_g$ of at least one of said grooves 7, measured according to a radial direction of the tire 10, ranges from 7 to 14 millimeters, preferably 8 to 13 millimeters, more preferably from 9 to 12 millimeters.

In a preferred embodiment at least one of said grooves 7 is the groove closest to the tire equatorial plane CL (or centerline CL) in a tire axial direction.

The tire equatorial plane CL is the plane dividing the tread portion 6 into two equally wide portions.

In another preferred embodiment two of said grooves 7 are the grooves closest to the tire equatorial plane CL (or centerline CL) in a tire axial direction.

In another preferred embodiment two of said grooves 7 are the grooves closest to the tire equatorial plane CL (or centerline CL) in a tire axial direction, wherein the two grooves 7 are disposed on both sides, one on each side, of the tire equatorial plane CL (or centerline CL) in a tire axial direction.

In another preferred embodiment one, two or three of said grooves 7 are disposed on both sides of the tire equatorial plane CL (or centerline CL) in a tire axial direction.

The advantage of said grooves 7 being in the central area of the pattern, i.e. in an area closer to the equatorial plane CL, is that the stiffness of the tread pattern is thereby increased, resulting in an improved rolling resistance.

In a preferred embodiment said grooves 7 are positioned within a maximum axial distance from the equatorial plane CL that corresponds to 30% of the axial width $W_1$, $W_2$, $W_3$, $W_4$ of the widest tread belt 1, 2, 3, 4.

The tire 10 according to the invention further comprises a carcass 5 (which may include one or more inner body plies), and at least one high elongation belt. The at least one high elongation belt is applied radially, as a single cord strip, externally to the carcass 5.

According to particular embodiments of the invention, the at least one high elongation belt is applied onto the most radially external side of an inner body ply of the tire. According to preferred embodiments of the invention, a tire comprising a plurality of belts radially superimposed to each other is provided, comprising one high elongation belt which corresponds to the second belt, starting from the carcass and going towards the tread portion.

According to the preferred embodiment shown in FIG. 1, the tire 10 comprises four belts, in particular a first, a second, a third and a fourth belt, starting from the carcass 5 and going towards the tread portion 8, respectively denoted by the numerical references 1, 2, 3, 4.

Figure 1A:
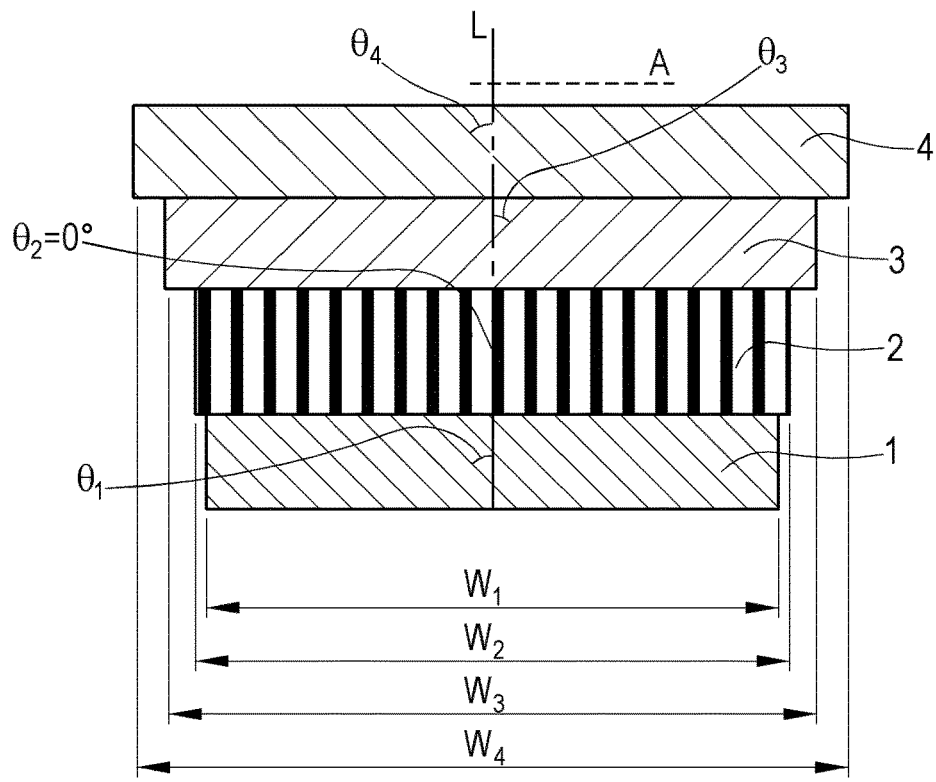
FIG. 1A is a simplified representation of a top view of the four belts comprised in the tire shown in FIG. 1.
Figure 2:
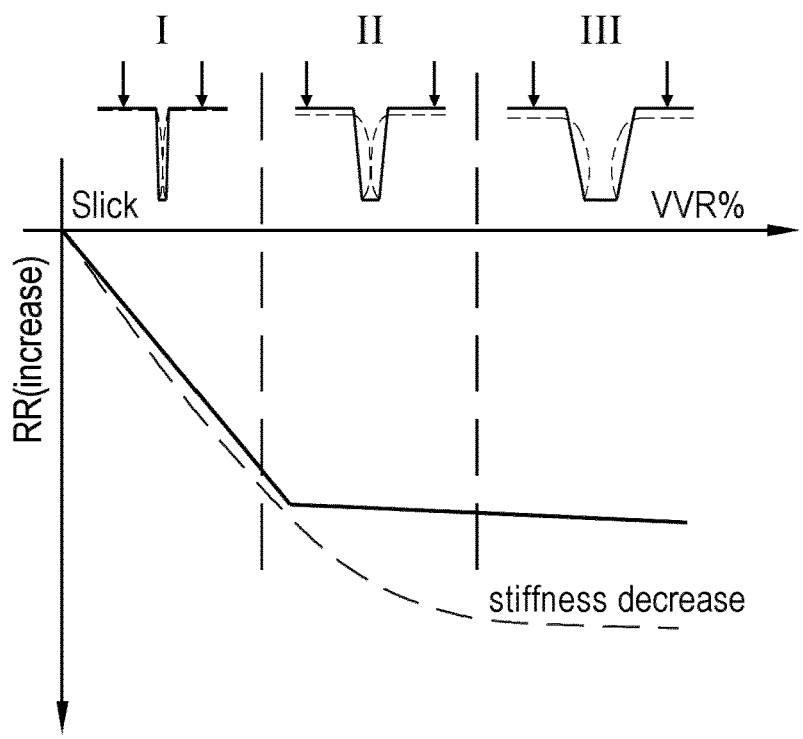
FIG. 2 is a diagram showing rolling resistance trend as function of Volume Void Ratio %.
Figures 3A, 3B, 3C:
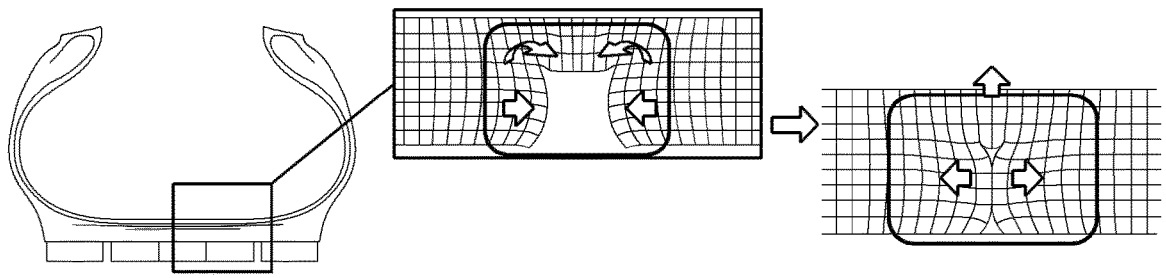
FIG. 3A shows a schematic cross-sectional view of a prior art tire provided with a closed pattern tread.
FIG. 3B shows an enlarged detail of FIG. 3A, relating in particular to a standard groove of the tire tread pattern of this latter FIG. 3A, under loading conditions.
FIG. 3C shows an enlarged detail of FIG. 3A, relating in particular to a closed pattern groove of the tire tread pattern of this latter FIG. 3A, subject to vertical load.
Figure 4:
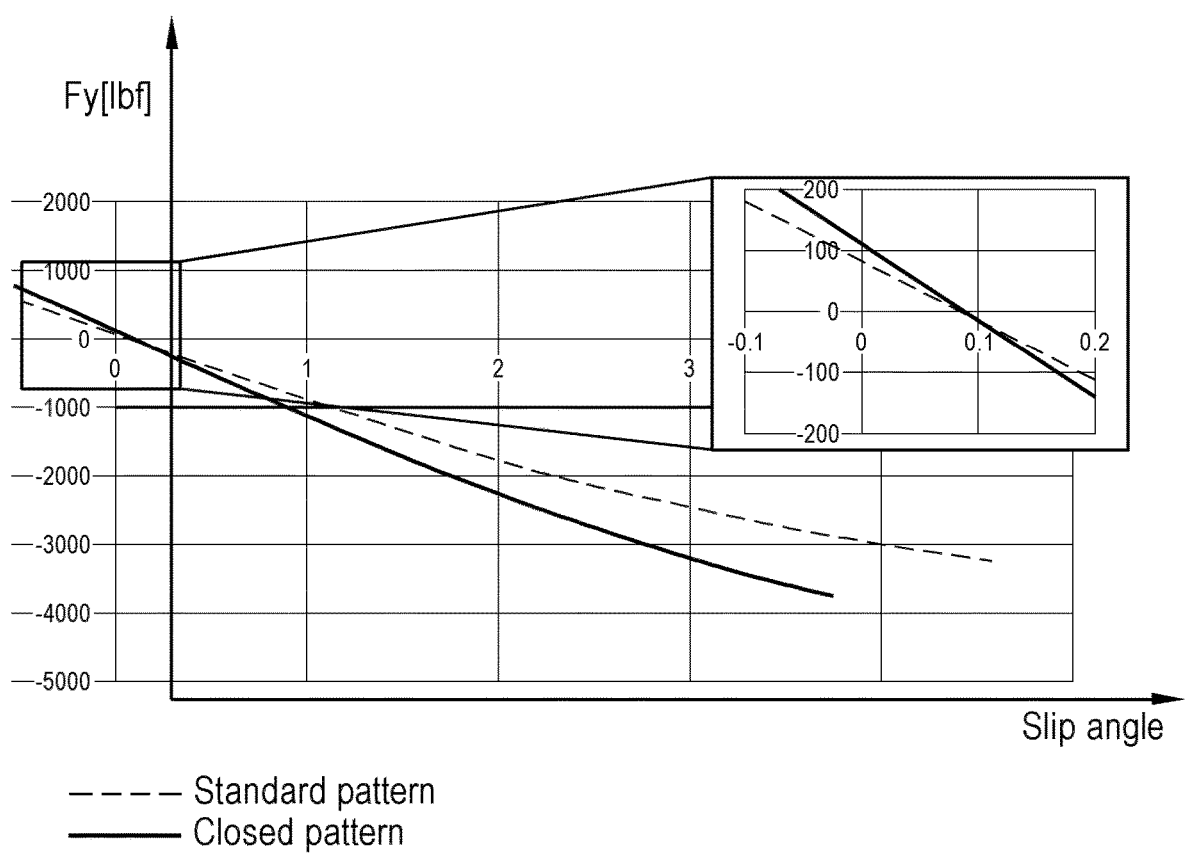
FIG. 4 is a diagram showing the residual force Fy trend as a function of slip angle for standard pattern and closed pattern tread design, respectively.
Figures 5, 6:
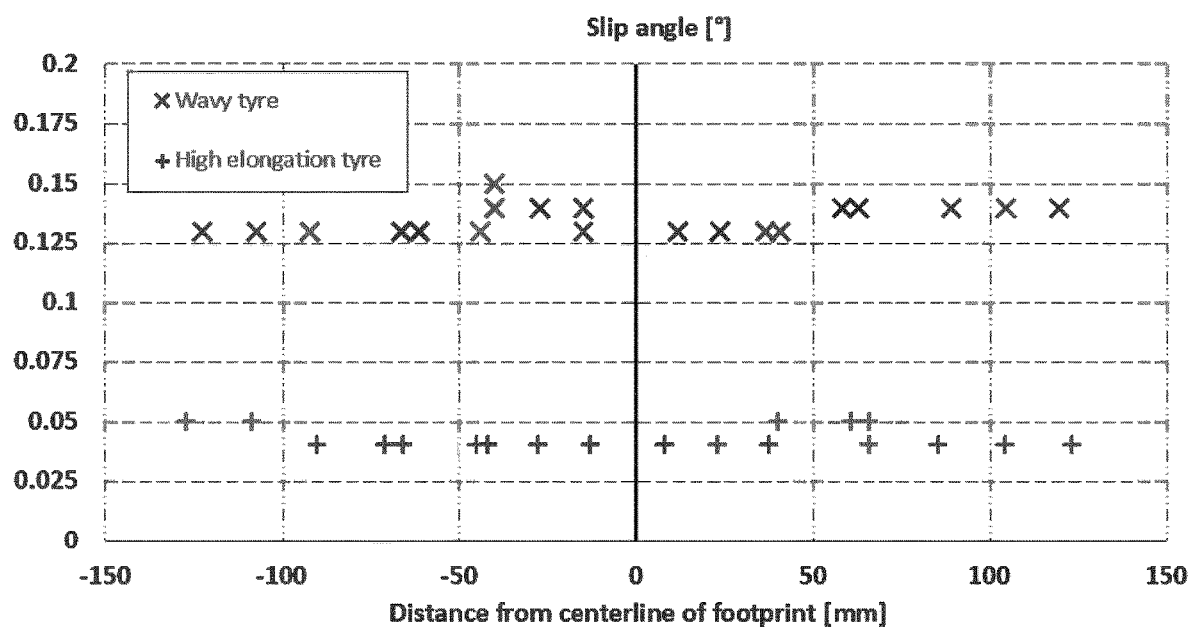
FIG. 5 shows exemplary values of the ply steer effect with reference to a standard pattern tire according to the prior art and a closed pattern tire according to the prior art.
FIG. 6 shows exemplary values of wear energy with reference to standard wavy tire according to the prior art and a tire provided with a high elongation belt and a closed pattern tread, according to a preferred embodiment of the invention.

Preferably, each of the four belts 1, 2, 3, 4 is applied in such a manner to define a respective belt cord angle, denoted in FIG. 1A with the references $\theta_1$, $\theta_2$, $\theta_3$ and $\theta_4$ respectively, and more preferably each of said belt cord angle $\theta_1$, $\theta_2$, $\theta_3$, $\theta_4$ is different from the other ones.

At least one of said first, second, third and fourth belt 1, 2, 3, 4 is a high elongation belt, applied as a single cord strip and having a belt cord angle equal to 0°. That is, the high elongation belt is configured as a longitudinal belt.

In particular, the single cord strip is spirally applied, and thanks to such a kind of application the obtainment of a belt cord angle equal to 0° is facilitated.

Preferably, the value of each belt cord angle $\theta_1$, $\theta_2$, $\theta_3$, $\theta_4$ ranges from 0° to 80°, measured with respect to the circumferential axis L.

More specifically, the belt cord angle is the lowest angle (having a positive or negative value of amplitude, wherein a positive amplitude is measured according to a clockwise direction, and a negative amplitude is measured according to a counterclockwise direction) comprised between the circumferential axis L and the cords main extension axis. As way of example, in FIG. 1A belt cord angles $\theta_1$ and $\theta_4$ are shown having an amplitude equal to about 45°, according to a counterclockwise direction.

According to the preferred embodiment of the invention shown in FIGS. 1 ad 1A, the second belt 2 is provided as a high elongation belt, applied as a single cord strip and being configured to define, as already said, a second belt cord angle $\theta_2$ equal to 0°.

In particular, the tire 10 comprises a first belt 1, defining a first belt cord angle $\theta_1$ ranging from 35° to 60°; a second high elongation belt 2, defining a second belt cord angle $\theta_2$ equal to 0°; a third belt 3, defining a third belt cord angle $\theta_3$ ranging from 20° to 40°; and a fourth belt 4, defining a fourth belt cord angle $\theta_4$ ranging from 40° to 60°.

According to a preferred embodiment of the invention, the ratio between the angles of the belts with respect to the first belt cord angle $\theta_1$ is defined as follows:

The second belt cord angle $\theta_2$ equals to 0°;

The third belt cord angle $\theta_3$ equals to 60%-80%, preferably to 70% of the first belt cord angle $\theta_1$ and the fourth belt cord angle $\theta_4$ equals to 120%-140%, preferably to 130% of the first belt cord angle $\theta_1$.

According to a more preferred embodiment of the invention, the first belt 1 defines a first belt cord angle $\theta_1$ equal to 40°, the second belt 2 defines a second belt cord angle $\theta_2$ equal to 0°, the third belt 3 defines a third belt cord angle $\theta_3$ equal to 28°, and the fourth belt 4 defines a belt cord angle $\theta_4$ equal to 52°.

Instead, according to an alternative embodiment of the invention, only the first belt 1 is a high elongation belt, being applied as a single cord strip and defining, according to such an embodiment, a first belt cord angle $\theta_1$ equal to 0°.

According to still another embodiment of the invention, both the first and the second belts 1, 2 are high elongation belts, being applied as a single cord strip and defining, respectively, a first $\theta_1$ and a second $\theta_2$ belt cord angle equal to 0°.

Referring again to the preferred embodiment of tire 10 shown in FIGS. 1 and 1A, each of said first, second, third and fourth belt 1, 2, 3, 4 has a respective width $W_1$, $W_2$, $W_3$, $W_4$, measured according said axial direction A, which ranges from 100 to 300 millimeters. According to a preferred embodiment of the invention, said width could range from 130 to 250 millimeters.

According to a preferred embodiment of the invention, the ratio between said width $W_2$, $W_3$, $W_4$ of the second, third and fourth belt 2, 3, 4 with respect to said width $W_1$ of the first belt 1 is defined as follows:

The width $W_2$ of the second belt 2 equals to 85%-100%, preferably to 92% 94% of the width $W_1$ of first belt 1, the width $W_3$ of the third belt equals to 95%-115%, preferably to 107%-109% of the width $W_1$ of first belt 1 and the width $W_4$ of the fourth belt 4 equals to 45%-60%, preferably to 55%-57% of the width $W_1$ of the first belt 1.

In particular, the first belt 1 has a first width $W_1$ equal to 230 millimeters, the second belt 2 has a second width $W_2$ equal to 215 millimeters, the third belt 3 has a third width $W_3$ equal to 250 millimeters, and the fourth belt 4 has a fourth width $W_4$ equal to 130 millimeters.

As visible in FIG. 1, the four belts 1, 2, 3, 4 are radially superimposed to each other in such a manner to realize a sandwich structure or belt system. In particular, the first belt 1 is at an innermost position and the fourth belt 4 is at an outermost position with respect to the other belts 2, 3. According to such an embodiment, the second belt 2 is interposed between the first 1 and the third belt 3, whereas the third belt 3 is interposed between the second belt 2 and the fourth belt 4.

The tire according to the embodiments above disclosed is particularly intended to be a truck or bus tire.

The present invention has been up to here described with reference to preferred embodiments. It is to be intended that other embodiments are possible within the same inventive core, as defined by the scope of protection of the following claims.

The invention claimed is:

1. A tire comprising:
a carcass;
a first belt, a second belt, a third belt, and a fourth belt radially superimposed to each other, wherein the first belt is at an innermost position and the fourth belt is at an outermost position with respect to the other belts, each of the first to fourth belts having a respective belt cord angle, wherein at least one of the first to fourth belts is a high elongation belt applied as a single cord strip radially externally to said carcass, said high elongation belt embedding a cord provided with a stiffness module variable between about 3,000 MPa for a strain value of said cord ranging from 0 to about 2% and 125,000 MPa for a strain value of said cord higher than about 2%; and
an external tread portion provided with two or more grooves extending according to a circumferential direction around said tread portion, wherein an axial width of each of the two or more grooves, measured according to an axial direction parallel to an axis of rotation of said tire and orthogonal to said circumferential direction, is equal to or lower than 2 millimeters,
wherein:
the first belt cord angle equals from 35° to 40° measured counterclockwise from the circumferential direction;
the second belt cord angle equals about 0° from the circumferential direction;
the third belt cord angle equals from 20° to 28° measured clockwise from the circumferential direction; and
the fourth belt cord angle equals from 40° to 60° measured counterclockwise from the circumferential direction.

2. The tire of claim 1, wherein said cord embedded in said high elongation belt has an elongation at break between 2.5% and 3.5%.

3. The tire of claim 1, wherein each of the two or more grooves have a depth in the radial direction and the axial width of each of the two or more grooves is substantially constant over a full depth of each of the two or more grooves.

4. The tire of claim 1, wherein:
said first belt cord angle is equal to 40°;
said third belt cord angle is equal to 28°; and
said fourth belt cord angle (Q4) is equal to 52°.

5. The tire of claim 1, which is a truck tire.

6. The tire of claim 1, wherein said first, second, third and fourth belts are radially superimposed to each other starting from said first belt to said fourth belt, wherein said first belt is at an innermost position and said fourth belt is at an outermost position with respect to the other belts.

7. The tire of claim 6, wherein said first belt is a high elongation belt applied as a single cord strip and having a belt cord angle equal to 0°.

8. The tire of claim 1, wherein each of said first, second, third and fourth belt has a respective width, measured according said axial direction, which ranges from 100 to 300 millimeters.

9. The tire of claim 8, wherein a ratio between the widths of the second, third, and fourth belt with respect to said width of the first belt is defined as follows:
the width of the second belt is from 85%-100% of the width of the first belt;
the width of the third belt is from 95%-115% of the width of the first belt; and
the width of the fourth belt is from 45%-60% of the width of the first belt.

10. The tire of claim 8, wherein each said respective width ranges from 130 to 250 millimeters.

11. The tire of claim 10, comprising:
a first belt having a first width equal to 230 millimeters;
a second belt having a second width equal to 215 millimeters,
a third belt having a third width equal to 250 millimeters; and
a fourth belt having a fourth width equal to 130 millimeters.

12. The tire of claim 1, wherein two of said two or more grooves are those grooves closest to a tire equatorial plane in a tire axial direction.

13. The tire of claim 12, wherein said two grooves are disposed one on each side of the tire equatorial plane in a tire axial direction.

14. The tire of claim 13, wherein more than one groove is disposed on each side of the equatorial plane in a tire axial direction.

15. The tire of claim 13, wherein between one and three grooves are disposed on each side of the equatorial plane in a tire axial direction.

\* \* \* \* \*